United States Patent [19]
Tayama

[11] Patent Number: 5,680,181
[45] Date of Patent: Oct. 21, 1997

[54] METHOD AND APPARATUS FOR EFFICIENT MOTION VECTOR DETECTION

[75] Inventor: Masashi Tayama, Sunnyvale, Calif.

[73] Assignees: Nippon Steel Corporation, Tokyo, Japan; Zapex Technologies, Inc., Mountain View, Calif.

[21] Appl. No.: 545,941

[22] Filed: Oct. 20, 1995

[51] Int. Cl.[6] .................................................. H04N 5/14
[52] U.S. Cl. ..................... 348/699; 348/413; 348/716; 348/717
[58] Field of Search ........................... 348/699, 413, 348/415, 416, 402, 716, 717; H04N 7/36, 7/50, 5/14

[56] References Cited

U.S. PATENT DOCUMENTS 5,170,259  12/1992  Niihara .................................. 348/415
5,469,214  11/1995  Bazzaz ................................... 348/416
5,510,842   4/1996  Phillips .................................. 348/416
5,557,332   9/1996  Koyanani ............................... 348/416

OTHER PUBLICATIONS

"Motion Estimation Processor" SGS–Thomson Microelectronics Advance Sheet, No. ST13220, Jul. 1992, pp. 97–117.

*Primary Examiner*—Howard W. Britton
*Attorney, Agent, or Firm*—Fliesler, Dubb, Meyer & Lovejoy LLP

[57] ABSTRACT

A method and apparatus for efficient motion vector detection is disclosed that provides an expanded search window with a plurality of motion processors. The internal search window of each motion processor is arranged as a set of N row by M column rectangular subblocks. An address generator circuit scans a stream of pixel data values out of a reference frame memory while a set of delay circuits route the stream of pixel data values to the input paths for the internal subblocks and match input timing for the motion processors.

18 Claims, 6 Drawing Sheets

| REFERENCE BLOCK n | REFERENCE BLOCK n+1 | REFERENCE BLOCK n+2 |
|---|---|---|
| REFERENCE BLOCK n+3 | REFERENCE BLOCK n+4 | REFERENCE BLOCK n+5 |
| REFERENCE BLOCK n+6 | REFERENCE BLOCK n+7 | REFERENCE BLOCK n+8 |
| REFERENCE BLOCK n+9 | REFERENCE BLOCK n+10 | REFERENCE BLOCK n+11 |
| REFERENCE BLOCK n+12 | REFERENCE BLOCK n+13 | REFERENCE BLOCK n+14 |

EXPANDED SEARCH WINDOW

FIG. 4

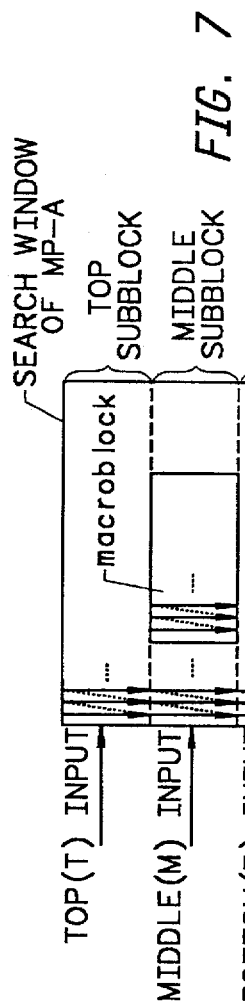
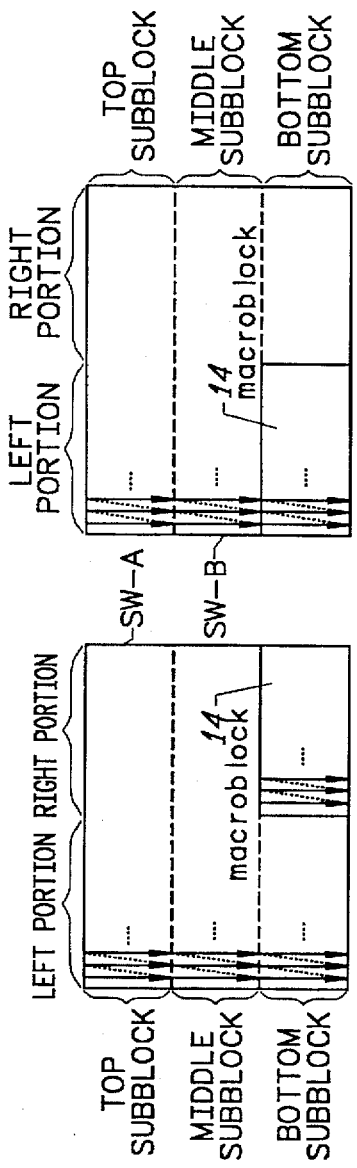
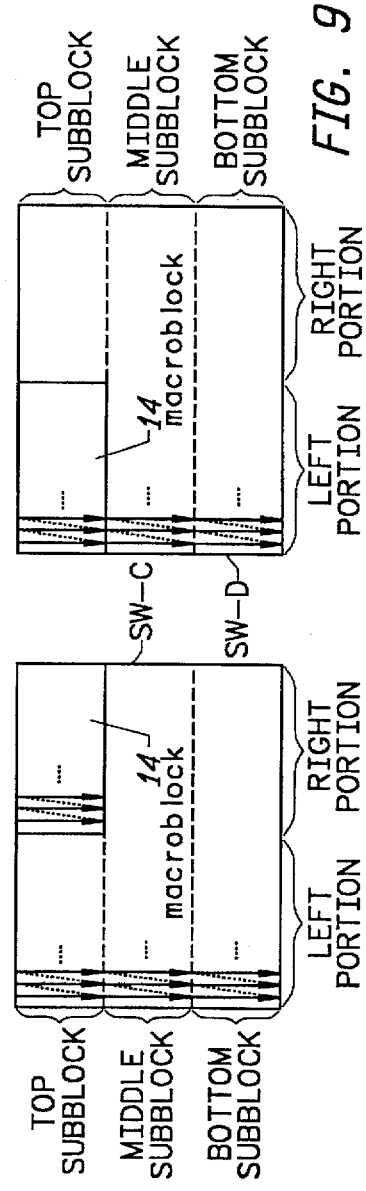
FIG. 7
FIG. 9

METHOD AND APPARATUS FOR EFFICIENT MOTION VECTOR DETECTION

BACKGROUND OF THE INVENTION

1. Field of the Invention

The present invention pertains to the field of digital video systems. More particularly, this invention relates to a mechanism for expanding a motion vector search window that minimizes hardware costs and complexities of video frame buffer access.

2. Art Background

Digital video systems typically represent an image scene with a series of video frames. Such a series of video frames usually contain digital samples of an original image scene. Typically, each of the video frames contains a rectangular matrix of pixel data values for the sampled image scene.

Prior systems commonly store such a series of video frames on a mass storage device such as a CD-ROM or a laser disk to enable later reproduction of the original image scene. Other prior systems such as video conferencing systems or server systems transmit such a series of video frames to remote locations to enable recreation of the original image scene at the remote locations.

Such prior video systems typically employ video data compression techniques to reduce the total amount of data required to recreate the original image scene. Typically, such video compression techniques reduce the amount of media space required to store the video frames while still enabling a reasonable recreation of the original image scene. Such video data compression typically increases the amount of video that can be stored on a given media such as a CD-ROM or laser disk.

In addition, such video data compression techniques usually reduce the bandwidth demands on communication links that carry the compressed video frames to remote locations. Such a reduction in bandwidth typically reduces the cost of remote video applications such as video-conferencing by obviating the need for expensive high bandwidth communication links.

Prior video systems typically perform such video compression by encoding video frames with respect to earlier video frames in the series. A current frame commonly refers to a particular video frame being encoded and a reference frame refers a prior video frame in the series selected for encoding the current frame.

Typically, such systems encode a current frame by determining differences between the pixel data values of the current frame and corresponding pixel data values of the reference frame. Such encoding is generally effective for static images wherein the pixel data values of the current frame and the reference frame are very similar. However, such techniques are usually less effective for image scenes that contain moving objects. As a consequence, prior video compression systems typically employ motion estimation techniques.

Typically, motion estimation involves the designation of a rectangular area of the reference frame as a search window. In addition, the current frame is typically subdivided into blocks that are referred to as macroblocks and a particular macroblock is selected for encoding. The selected macroblock is usually compared to pixelblocks contained within the search window of the reference frame. Typically, a particular pixelblock within the search window of the reference frame is selected as having the best match to the macroblock. A motion vector is then usually determined that indicates the relative spacial offset between the macroblock and the selected pixelblock in the search window. The motion vector can then be used to represent the macroblock by a special relationship to the selected pixelblock and thereby minimize the amount of video data required to reproduce the current frame.

Prior video compression systems commonly employ specialized motion estimation processors to compare the macroblock with pixelblocks in the search window. Such specialized motion estimation processors are usually loaded with the pixel data values from the search window and the pixel data values of the macroblock of the current frame. Typically, such a specialized motion estimation processor calculates error measures that indicate differences between the macroblock and the pixelblocks in the search window.

Typically, the quality of reproduced images realized by such motion estimation techniques improves as the dimensions of the search window in the reference frame increase. An expanded search window usually increases the likelihood of finding a good match between the macroblock and one of the pixelblocks in the search window. Such an expanded search window is particularly effective for encoding and reproducing images that contain fast moving objects.

Prior systems typically provide an expanded search window by employing multiple motion estimation processors that each perform motion estimation functions for a sub-area of the expanded search window. Unfortunately, such systems typically require high bandwidth scanning or read access of the video memory that holds the reference frame. Such higher bandwidth video memory access is usually required to maintain a given rate of video compression because multiple motion estimation processor must be loaded with search window data from the same reference frame video memory during a fixed time interval. Unfortunately, such high bandwidth video memory access typically increases the overall cost of such systems by requiring faster video memories and higher speed data paths between the motion estimation processors and the video memory.

On the other hand, some systems avoid such high bandwidth video memory accesses by duplicating the reference frame in multiple video frame memories. Typically, each video frame memory supplies search window data to a corresponding motion estimation processor via a separate relatively low bandwidth data path. Unfortunately, such systems require large amounts of video memory to hold the multiple copies of the reference frame. In addition, such systems typically require complex address generation circuitry to independently access search window data from each reference frame memory. Such extra video memory and complex addressing circuitry typically increases the overall design complexities and manufacturing costs of such video systems.

SUMMARY AND OBJECTS OF THE INVENTION

One object of the present invention is to provide efficient motion estimation in a video system by providing an expanded search window.

Another object of the present invention is to expand the search window with multiple specialized motion estimation processors while minimizing the bandwidth demands on the video memories that supply search window data to the motion estimation processors.

A further object of the present invention is to supply expanded search window data to multiple specialized motion estimation processors from a single video frame memory.

Another object of the present invention is to supply expanded search window data to multiple specialized motion estimation processors via a single data path from video frame memory.

These and other objects are provided by a motion estimator that includes a plurality of motion processors that each perform motion estimation within an internal search window wherein the internal search windows together provide motion estimation for an expanded search window. Each internal search window is arranged as a set of N row by M column rectangular subblocks and each motion processor provides separate input paths for each internal subblock. The motion estimator includes an address generator circuit that scans a stream of pixel data values out of a reference frame memory via a data path wherein the pixel data values are serially scanned out in groups of N vertical pixels from left to right and top to bottom within a search window of the reference frame. The motion estimator includes a set of delay circuits that route the pixel data values on the data path to the input paths for the internal subblocks of each motion processor which provides a stream of input pixel data values for each subblock in accordance with the input timing requirements of the motion processors.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 4 illustrates an arrangement of pixel data for an expanded search window which is distributed among the set of motion processors;

FIG. 7 illustrates the scanning of pixel data values from the reference frame memory into a search window area provided by a single motion processor;

FIG. 9 illustrates the scanning of the extended search window data and the macroblock data into the search window areas of each of the motion processors.

DETAILED DESCRIPTION

Figure 1:
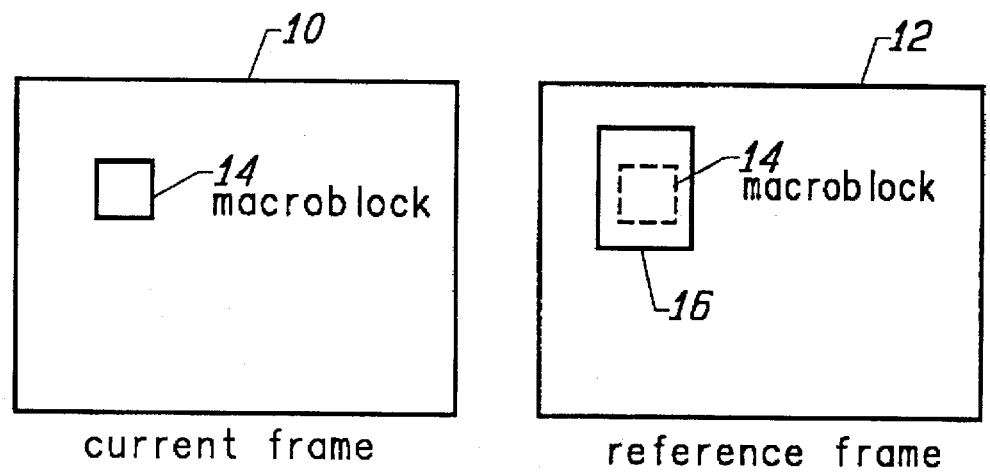
FIG. 1 illustrates motion estimation between a current frame and a reference frame which are selected from a series of video frames containing pixel data values that represent an image scene.

FIG. 1 illustrates motion estimation between a current frame 10 and a reference frame 12. The current frame 10 and the reference frame 12 are selected from a series of video frames containing pixel data values that represent an image scene. The current frame 10 is encoded with respect to the reference frame 12. The reference frame 12 is a video frame of the image scene that occurs earlier in the series of video frames of the image scene with respect to the current frame. A macroblock 14 is selected within the current frame 10 for motion estimation with respect to the reference frame 12.

The macroblock 14 comprises a matrix of pixel data values from the originally sampled image scene. A search window 16 is selected within the reference frame 12. The process of motion estimation involves comparing the pixel data values of the macro block 14 to each rectangular pixel block area of similar dimensions within the search window 16 of the reference frame 12.

Figure 2:
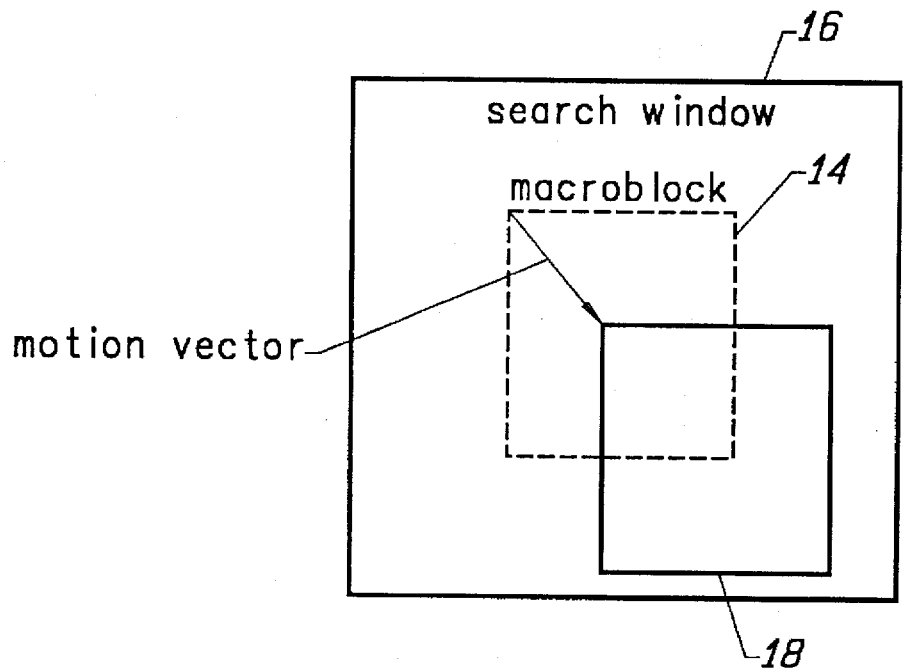
FIG. 2 illustrates a motion vector that represents the relative spacial offset between a macroblock of the current frame and a selected pixelblock within a search window of the reference frame.

FIG. 2 illustrates a motion vector that represents the relative spacial offset between the macroblock 14 and a pixelblock 18 within the search window 16. The pixelblock 18 is a pixelblock within the search window 16 that most closely corresponds to the macroblock 14 according to an error measure. The error measure indicates differences in the pixel data values contained in the macroblock 14 and pixel data values contained in the pixelblock 18. The error measure may be, for example, a sum of absolute differences (SAD) error measure or a means-squared error (MSE) or some other error measure.

Figure 3:
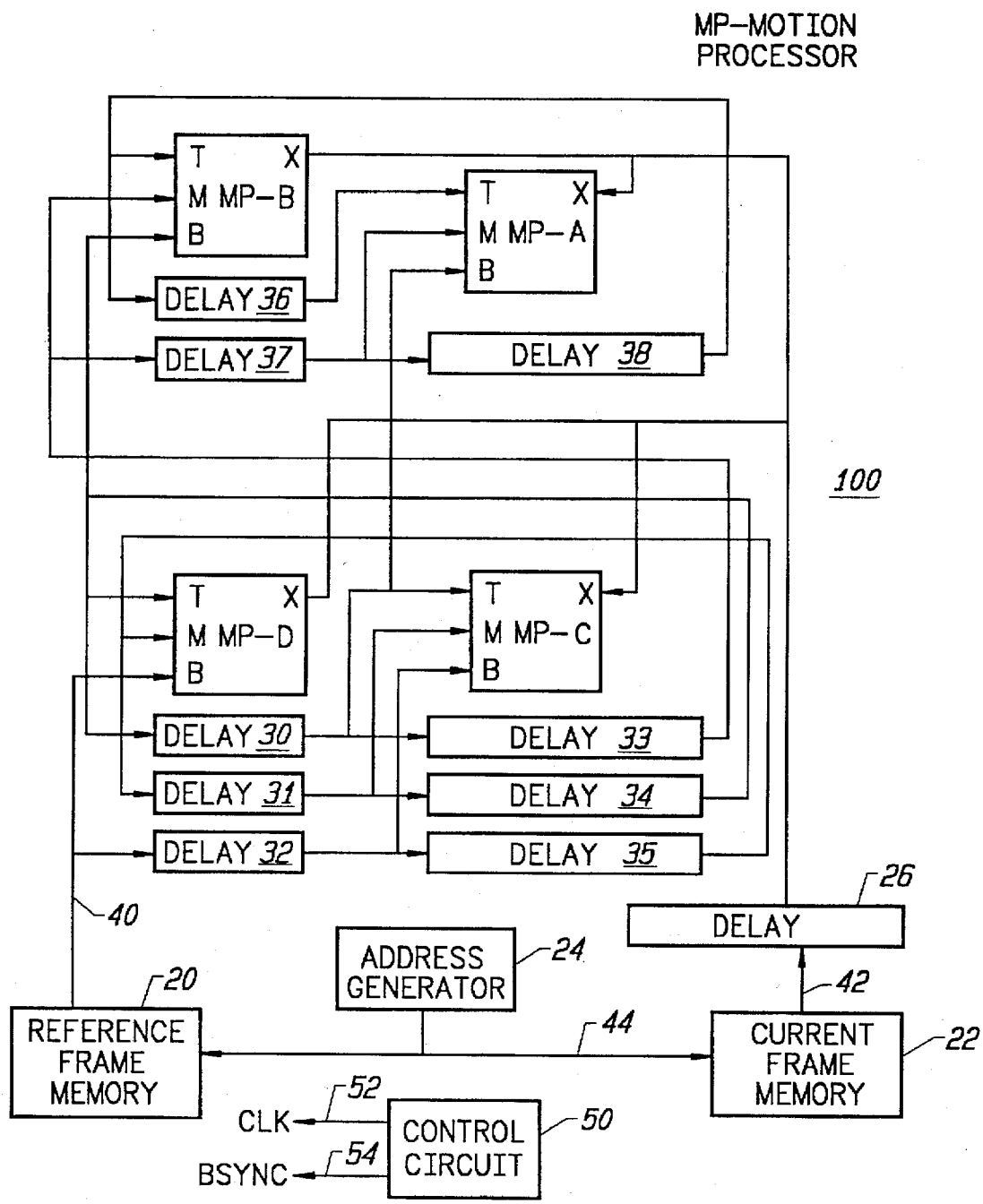
FIG. 3 illustrates a motion estimator circuit that includes a set of four substantially similar motion processors and circuitry for efficiently loading search window and macroblock data into the motion processors.

FIG. 3 illustrates a motion estimator circuit 100 for one embodiment. The motion estimator circuit 100 includes a set of four substantially similar motion processors including a motion processor A (MP-A), a motion processor B (MP-B), a motion processor C (MP-C), and a motion processor D (MP-D). Individually, each motion processor A–D provides motion vector detection for a corresponding internal search window area. The motion processors A–D working in concert provide an expanded search window in comparison to that of a single motion processor and enable expansion of the search window 16. The search window expansion increases the efficiency of motion estimation in comparison to a single motion estimation processor.

For one embodiment, each motion processor A–D is a single chip STI 3220 motion estimation processor available from SGS-Thomson Microelectronics. For more information on the motion processors A–D refer to the advance data sheet for the STI 3220 dated July, 1992, and available from SGS-Thomson Microelectronics and which is incorporated fully herein by reference.

For this embodiment, the internal search window for each motion processor A–D is loaded with search window data through a set of 3 search window input paths which are referred to as a top (T) search window input path, a middle (M) search window input path, and a bottom (B) search window input path. Macroblocks are loaded into each of the motion processors A–D through a corresponding macroblock (X) input path.

FIG. 4 illustrates one arrangement of data for the expanded search window 16 which is distributed among the motion processors A–D. The search window 16 includes a set of reference blocks n-n+14 from the reference frame 12. For this embodiment, each reference block n-n+14 comprises a 16×8 block of pixel data values from the reference frame 12.

Figure 5:
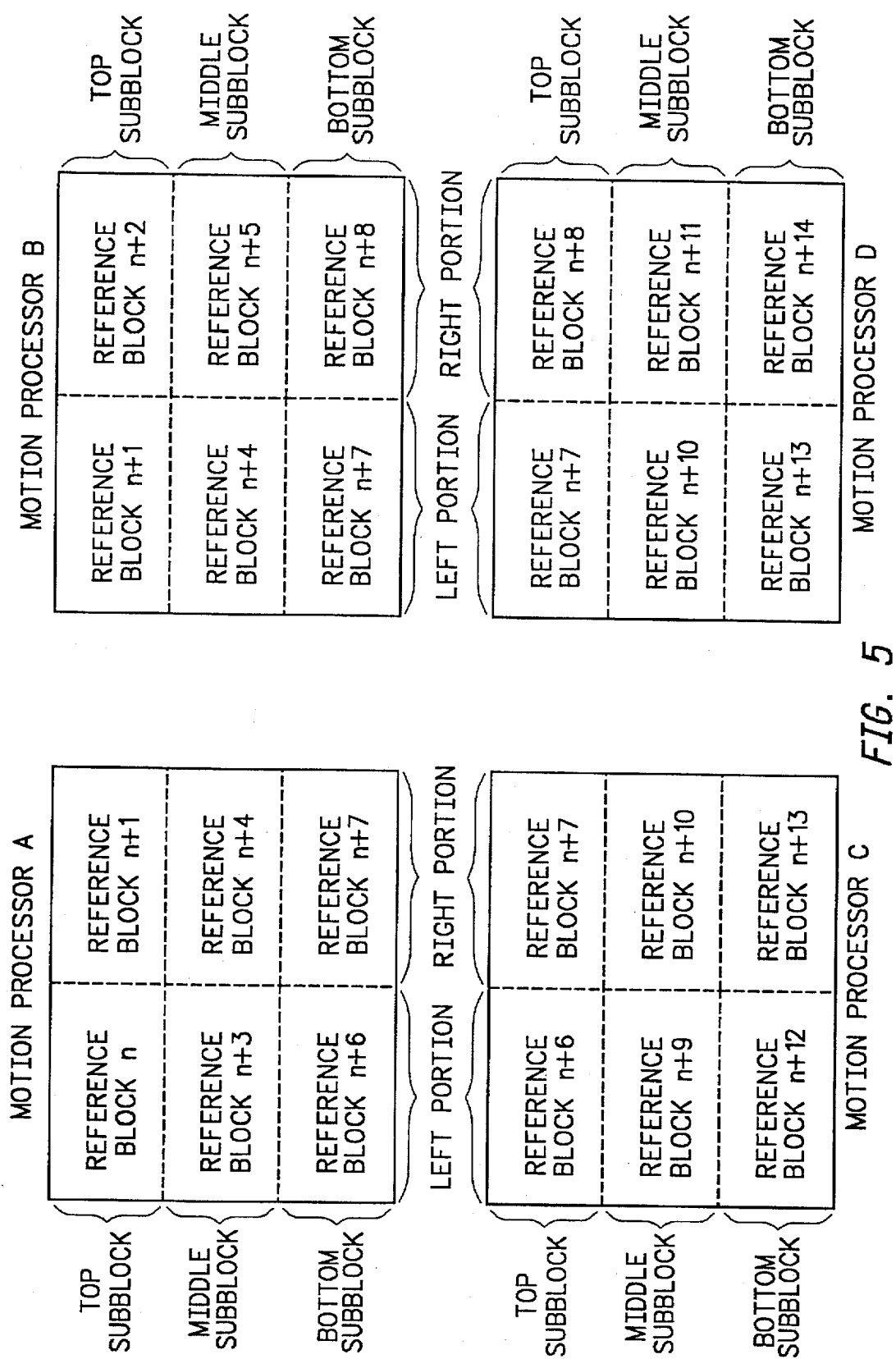
FIG. 5 illustrates the mapping of the reference blocks of the expanded search window to the individual search window areas provided by each of the motion processors.

FIG. 5 illustrates the mapping of the reference blocks n-n+14 of the search window 16 to the internal search windows provided by the motion processors A–D. For one embodiment, the internal search window of each motion processor A–D is arranged as a set of rectangular search window subblocks referred to as a top subblock, a middle subblock, and a bottom subblock. Each top, middle, and bottom search window subblock is further subdivided into a left portion and a right portion. The top, middle, and bottom search window subblocks of the motion processors A–D are loaded through the corresponding T, M, and B input paths.

The top left subblock of the motion processor A is loaded with reference block n from the search window 16. The middle and bottom left subblocks of the motion processor A are loaded with reference blocks n+3 and n+6 respectively. The top, middle and bottom right subblocks of the motion processor A are loaded with reference blocks n+1, n+4 and n+7 respectively.

The top, middle, and bottom right subblocks of the motion processor A overlap the top, middle, and bottom left subblocks of the motion processor B and contain pixel data values from the same reference blocks n+1, n+4 and n+7 respectively. Similarly, the top, middle, and bottom right subblocks of the motion processor C overlap the top, middle, and bottom left sub-blocks of the motion processor D and contain the same pixel data values from the reference blocks n+7, n+10 and n+13 respectively.

In addition, the bottom left and right search window portions of the motion processor A overlap top left and right portions of the motion processor C and contain the same reference blocks n+6 and n+7. Similarly, the bottom left and right search window portions of the motion processor B overlap top left and right portions of the motion processor D and contain the same reference blocks n+7 and n+8. Such horizontal and vertical overlapping of internal search windows among the motion processors A–D ensures that no undetectable areas occur in the search window 16 as motion estimation functions are distributed across multiple motion processors.

The motion estimator circuit 100 includes a reference frame memory 20, a current frame memory 22, and an address generator 24. The address generator 24 transfers a series of address signals on an address path 44 to scan pixel data out of both the reference frame memory 20 and the current frame memory 22. The series of addresses from the address generator 24 scans out a serial stream of pixel data values from the reference frame memory 20 to the search window inputs (T, M, and B) of the motion processors A–D via a data path 40. The series of addresses generated by the address generator 24 also scans out a serial stream of pixel data values from the current frame memory 22 to the macroblock (X) inputs of the motion processors A–D via a data path 42.

For one embodiment, the data path 40 is 8 bits wide, and the T, M, and B search window input paths are each 8 bits wide. In such an embodiment, the data path 42 is 8 bits wide and the macroblock X input path of each motion processor A–D is 8 bits wide. The 8 bit input path widths accommodate serial streams of 8 bit pixel data values scanned out of the reference frame memory 20 and the current frame memory 22.

Figure 6:
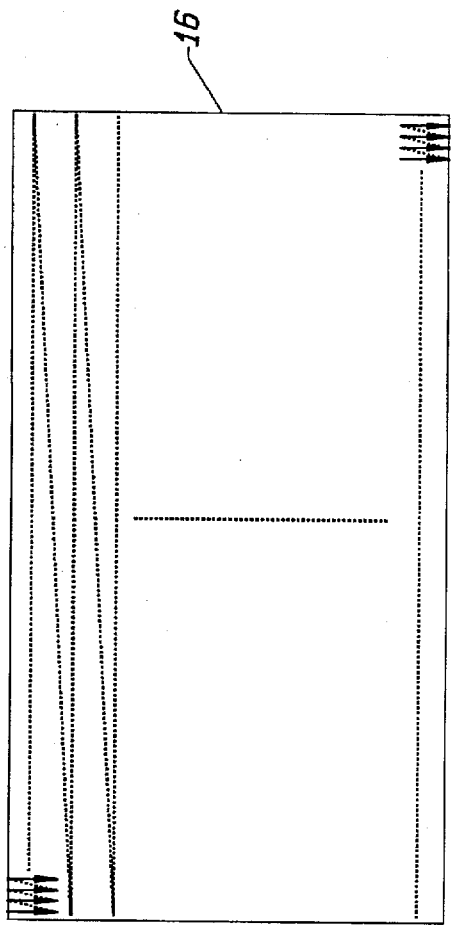
FIG. 6 illustrates a sequence in which the address generator scans out pixel data values from the reference frame memory.

FIG. 6 illustrates a sequence in which the address generator 24 serially scans out search window pixel data values from the reference frame memory 20 in one embodiment. The sequence of pixel data values from the search window 16 in the reference frame memory 20 starts at the top left portion of the search window 16 and proceeds from left to right and top to bottom as shown. The address generator 24 scans out columns of 8 vertical pixels followed by adjacent columns of 8 vertical pixels from left to right and then from top to bottom in groups of 8 vertical pixels. The scanning sequence shown accommodates the input scanning sequence required by the motion processors A–D which have internal search windows arranged as top middle and bottom subblocks each having 8 rows of pixels. The scanning sequence may readily be changed to accommodate search window arrangements of other types of motion processors in other embodiments.

The motion estimator circuit 100 includes a control circuit 50 that generates a block synchronization (BSYNC) control signal 54 and a pixel clock (CLK) signal 52. The BSYNC 54 and CLK 52 signals are control input signals coupled to each of the motion processors A–D. The BSYNC control signal 54 indicates the start of input block sequences for loading search window and macroblock data into the motion processors A–D. The CLK signal 52 strobes search window data through the T, M, and B input paths and strobes macroblock pixel data into the X input path of each motion processors A–D.

FIG. 7 illustrates the scanning of pixel data values from the reference frame memory 20 and the current frame memory 22 into a single motion processor such as the motion processors A in one embodiment. The scanning sequence shown for the motion processor A and is substantially similar for each of the motion processors B–D. Each search window subblock in the motion processor A is arranged as an 8 row by 32 column rectangular matrix of pixel data values and each left and right portion includes 16 columns. Each search window subblock is scanned in as a series of adjacent columns of 8 pixels as shown. The macroblock data for the motion processor A is arranged as an 8 row by 16 column rectangular matrix of pixel data values. Macroblock data is scanned into the motion processor A in a series of adjacent columns of 8 pixels. The input scanning sequences shown conform to the sequence of the pixel data values scanned out of the reference frame memory 20 and the current frame memory 22.

Figure 8:
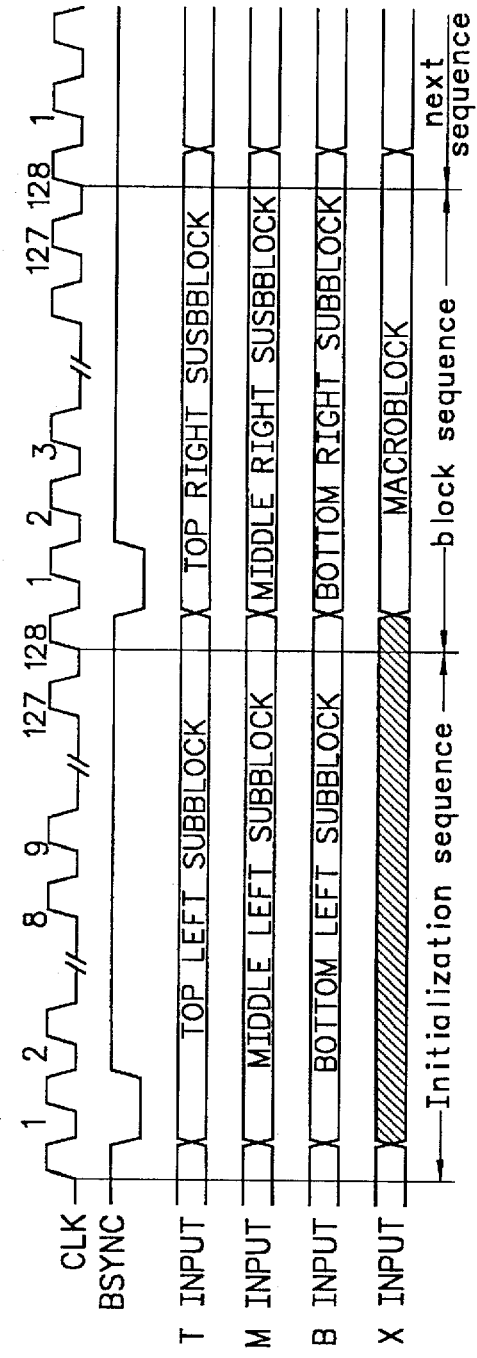
FIG. 8 illustrates the search window and macroblock input timing for an individual motion processor.

FIG. 8 illustrates the internal search window and macroblock input timing for the motion processor A. The input timing shown for the motion processor A is substantially similar to the input timing for each of the motion processors B–D. The input timing for loading search window and macroblock data into the motion processor A is arranged as an initialization sequence and a block sequence. The start of the initialization sequence and the start of the block sequence are each indicated by high to low transitions of the BSYNC 54 control signal. The loading of pixel data values at the T, M, B, and X input paths into the motion processor A is synchronized by the CLK signal 52.

During the initialization sequence, the top left, the middle left, and the bottom left search window subblocks are loaded through the T, M, and B input paths. The pixel data values at the T, M, and B inputs are strobed in by the CLK signal 52. For an embodiment wherein each search window subblock is an 8 by 32 rectangle, the 16 leftmost columns of each search window subblock are loaded in parallel during the initialization sequence. For such an embodiment, the parallel loading of the left search window portions requires 8×16 or 128 cycles of the CLK signal 52.

During the block sequence, the top right, middle right, and bottom right search window subblocks are loaded through the corresponding T, M, and B input paths and the macroblock data is loaded through the X input path. For an embodiment wherein each search window subblock is an 8 by 32 rectangle, the 16 rightmost columns of each search window subblock are loaded in parallel with all 16 columns of the macroblock. For such an embodiment, the block sequence requires 8×16 or 128 cycles of the CLK signal 52.

FIG. 9 illustrates the scanning of the reference blocks n-n+14 and the macroblock 14 into the motion processors A-D. The internal search windows of the motion processors A-D are referred to as search windows A-D (SW-A through SW-D). Each top, middle, and bottom subblock of each search window A-D is scanned in as a series of adjacent columns of 8 pixels from left to right in conformance with the stream of search window pixel data values scanned out of the reference frame memory 20 by the address generator 24. The macroblock 14 is scanned into each of the motion processors A-D in a series of adjacent columns of 8 pixels in accordance with the sequence in which the address generator 24 scans the stream of macroblock pixel data values out of the current frame memory 22.

The motion estimator circuit 100 includes a set of delay circuits 30-38 and a delay circuit 26. The delay circuits 30-38 route the search window pixel data stream scanned out of the reference frame memory 20 to the T, M, and B inputs of the motion processors A-D. The delay circuits 30-38 delay the search window data stream from the reference frame memory 20 to ensure that pixel data values for the top, middle, and bottom subblocks of the internal search windows A-D arrive at the T, M, and B input paths of the motion processors A-D at the appropriate times. The delay circuits 30-38 also yield the overlapping areas in the search windows A-D to prevent the existence of undetectable areas in the search window 16.

The right portion of the search window A contains the same data as the left portion of the search window B and the right portion of the search window C contains the same data as the left portion of the search window D. The required input timing for the T input path of the motion processor A is accomplished by delaying of the M input path of the motion processor A. The input timing for the M input path of the motion processor A is accomplished by delaying of the B input path of the motion processor A. Similarly, the T input paths of the motion processors B-D are derived from delays of the M input paths of the motion processors B-D, respectively, and the M input paths of the motion processors B-D are derived from delays of the B input paths of the motion processors B-D, respectively.

For one embodiment, each horizontal frame dimension in the reference frame memory 20 and the current frame memory 22 comprises 704 pixels. Referring again to FIG. 3, the pixel data stream from the reference frame memory 20 is routed to the B input path of the motion processor D and to the delay circuit 32. Given that the data for search window C is located 16 columns to the left of the data for the search window D, the T, M, and B input paths to the motion processor C are delayed 128 cycles (8 pixels×16 columns) of the CLK signal 52 from the T, M, and B input paths the motion processor D. The 128 cycle delay matches the input timing between the motion processors C and D. The delay circuits 30-32 each provide the needed 128 cycles of delay to match input timing between the motion processors C and D. Also, the delay circuits 36 and 37 each provide 128 cycles of delay to match input timing between the T and M input paths of the motion processors A and B.

The delay circuit 35 derives the data for the M input path of the motion processor D from the B input of the motion processor D. The delay circuit 35 provides a delay equal to (704−16)×8=5632 cycles of the CLK signal 52, where 704 equals the horizontal line width and 16 is the delay already provided by the delay circuit 32 and 8 is the height of a subblock. Similarly, the delay circuit 34 provides a 5632 cycle delay to derive the data for the T input path of the motion processor D from the M input of the motion processor D. Similar 5632 cycle delays are provided by the delay circuits 33 and 38 to derive top input paths from middle input paths and middle input paths from bottom input paths.

The delay circuit 26 provides the appropriate delay to route macroblock data from the current frame memory 22 into the X input path of each of the motion processors A-D and to meet the input timing requirements of the X input paths. The delay circuit 26 matches the input timing of the X input paths of the motion processors A-D to the timing to the T, M, and B search window input paths and thereby obviates the need for a separate address generator circuit to scan data out of the current frame memory 22. For the embodiment of FIG. 3, the delay circuit 26 provides a (704×2+15)×8=11384 cycle of the CLK signal 52 delay to the pixel data stream from the current frame memory 22.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A motion estimator, comprising:
   a plurality of motion processors that each perform motion estimation within an internal search window arranged as a set of N row by M column rectangular subblocks wherein each motion processor provides separate input paths for each internal subblock;
   address generator circuit that scans a stream of pixel data values out of a reference frame memory via a data path wherein the pixel data values are serially scanned out in groups of N vertical pixels from left to right and top to bottom within a search window of the reference frame memory;
   a set of delay circuits that route the pixel data values on the data path to the input paths for the internal subblocks to provide a stream of input pixel data values for each subblock.

2. The motion estimator of claim 1, wherein the subblocks of each internal search window comprise a top, a middle, and a bottom subblock.

3. The motion estimator of claim 2, wherein the delay circuits include a delay circuit that derives the stream of input pixel data values for the top subblock by delaying the stream of input pixel data values for the middle subblock.

4. The motion estimator of claim 2, wherein the delay circuits include a delay circuit that derives the stream of input pixel data values for the middle subblock by delaying the stream of input pixel data values for the bottom subblock.

5. The motion estimator of claim 1, wherein the internal search windows are arranged as a left search window portion and a right search window portion.

6. The motion estimator of claim 5, wherein the delay circuits include a set of delay circuits that derive the streams of input pixel data values for the left search window portion by delaying the streams of input pixel data values for the right search window portion.

7. The motion estimator of claim 1, wherein the address generator scans the stream of pixel data values out of the reference frame memory by transferring a series of addresses to the reference frame memory via an address path.

8. The motion estimator of claim 7, wherein the series of addresses on the address path scan a stream of pixel data values for a macroblock out of a current frame memory.

9. The motion estimator of claim 8, further comprising a delay circuit that routes the stream of pixel data values for the macroblock to a macroblock input path of each motion processor.

10. A motion estimation method, comprising the steps of:
providing a plurality of motion processors that each perform motion estimation within an internal search window arranged as a set of N row by M column rectangular subblocks wherein each motion processor provides separate input paths for each internal subblock;
serially scanning a stream of pixel data values out of a reference frame in groups of N vertical pixels from left to right and top to bottom within a search window of the reference frame;
providing preselected delays to the stream of the pixel data values and routing the delayed streams to supply a stream of input pixel data values for each subblock.

11. The method of claim 10, wherein the subblocks of each internal search window comprise a top, a middle, and a bottom subblock.

12. The method of claim 11, wherein the step of providing preselected delays includes the step of deriving the stream of input pixel data values for the top subblock by delaying the stream of input pixel data values for the middle subblock.

13. The method of claim 11, wherein the step of providing preselected delays includes the step of deriving the stream of input pixel data values for the middle subblock by delaying the stream of input pixel data values for the bottom subblock.

14. The method of claim 10, wherein the internal search windows are arranged as a left search window portion and a right search window portion.

15. The method of claim 14, wherein the step of providing preselected delays includes the step of deriving the streams of input pixel data values for the left search window portion by delaying the streams of input pixel data values for the right search window portion.

16. The method of claim 10, wherein the step of scanning the stream of pixel data values out of the reference frame includes the step of transferring a series of addresses to a reference frame memory via an address path.

17. The method of claim 16, further comprising the step of scanning a stream of pixel data values for a macroblock out of a current frame by transferring the series of addresses to a current frame memory via the address path.

18. The method of claim 17, further comprising the step of delaying and transferring the stream of pixel data values for the macroblock to a macroblock input path of each motion processor.

* * * * *